(12) United States Patent
Hada et al.

(10) Patent No.: US 7,940,057 B2
(45) Date of Patent: May 10, 2011

(54) METHOD OF DETECTING DISCONNECTION AND POWER DISCONTINUITY OF I/O UNIT CONNECTED TO NUMERICAL CONTROLLER

(75) Inventors: Kouji Hada, Yamanashi (JP); Yuji Sone, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 350 days.

(21) Appl. No.: 12/174,849

(22) Filed: Jul. 17, 2008

(65) Prior Publication Data

US 2009/0051367 A1 Feb. 26, 2009

(30) Foreign Application Priority Data

Aug. 23, 2007 (JP) ................................. 2007-216926

(51) Int. Cl.
*G01R 31/02* (2006.01)
*G06F 15/173* (2006.01)
*G06F 11/30* (2006.01)

(52) U.S. Cl. .......................... 324/537; 709/224; 713/340

(58) Field of Classification Search .................. 324/537, 324/500, 76.11, 555; 702/118, 117, 120; 709/224, 223; 713/340; 714/22, 43
See application file for complete search history.

(56) References Cited

U.S. PATENT DOCUMENTS

| | | | | |
|---|---|---|---|---|
| 4,292,668 A | * | 9/1981 | Miller et al. | ..................... 710/22 |
| 4,366,350 A | * | 12/1982 | Lee et al. | ................... 379/29.07 |
| 5,390,132 A | * | 2/1995 | Shioe et al. | ..................... 709/224 |
| 5,900,179 A | * | 5/1999 | Bilenko et al. | ................ 219/508 |
| 2004/0148542 A1 | * | 7/2004 | McAfee et al. | .................... 714/2 |

FOREIGN PATENT DOCUMENTS

| | | |
|---|---|---|
| JP | 57-3153 | 1/1982 |
| JP | 61-46654 | 3/1986 |
| JP | 4-349733 | 12/1992 |
| JP | 5-211560 | 8/1993 |
| JP | 6-177902 | 6/1994 |
| JP | 8-154101 | 6/1996 |
| JP | 2003-209590 | 7/2003 |

* cited by examiner

*Primary Examiner* — Hoai-An D Nguyen
(74) *Attorney, Agent, or Firm* — Drinker Biddle & Reath LLP (57) ABSTRACT

A power discontinuity occurring in any one of a plurality of I/O units connected to a numerical controller is detected. When the power discontinuity occurs in any one of the I/O units, the I/O unit detects the power discontinuity, and transmits the detection of the power discontinuity to an I/O unit in front of the I/O unit, at a timing different from a timing of an ordinary communication, in the form of a communication packet having a data pattern different from an ordinary data pattern. When the front I/O unit receives the communication packet, the communication packet is stored in a memory as power discontinuity detection information.

6 Claims, 6 Drawing Sheets

METHOD OF DETECTING DISCONNECTION AND POWER DISCONTINUITY OF I/O UNIT CONNECTED TO NUMERICAL CONTROLLER

BACKGROUND OF THE INVENTION

1. Field of the Invention

The present invention relates to a method of detecting a disconnection and a power discontinuity of an external signal input/output unit connected to a machine tool. More specifically, the present invention relates to a method of detecting a disconnection and a power discontinuity of one of master-slave I/O units included in a numerical controller and a machine tool.

2. Description of the Related Art

There is known a configuration in which a plurality of external signal input/output units (hereinafter referred to as "I/O units") is connected to one another so as to input or output DI/DO signals (input signals/output signals) between a numerical controller and a machine tool. Generally, the numerical controller and the I/O unit communicate DI/DO data with each other.

Figure 8A:
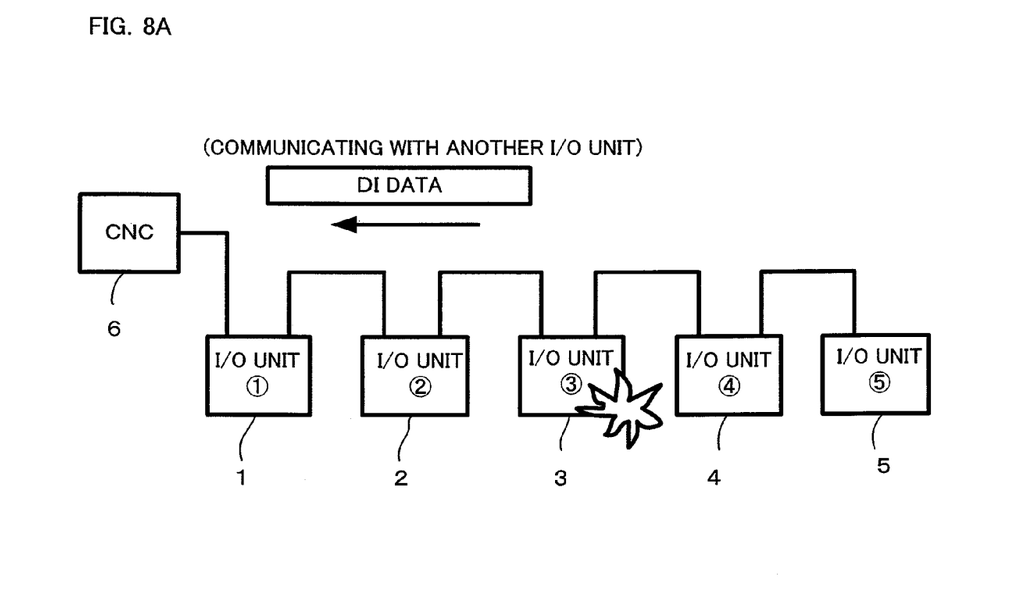
FIGS. 8A and 8B are schematic diagrams showing an example of transmitting alarm information in response to a command from a master unit according to a conventional technique.
Figure 8B:
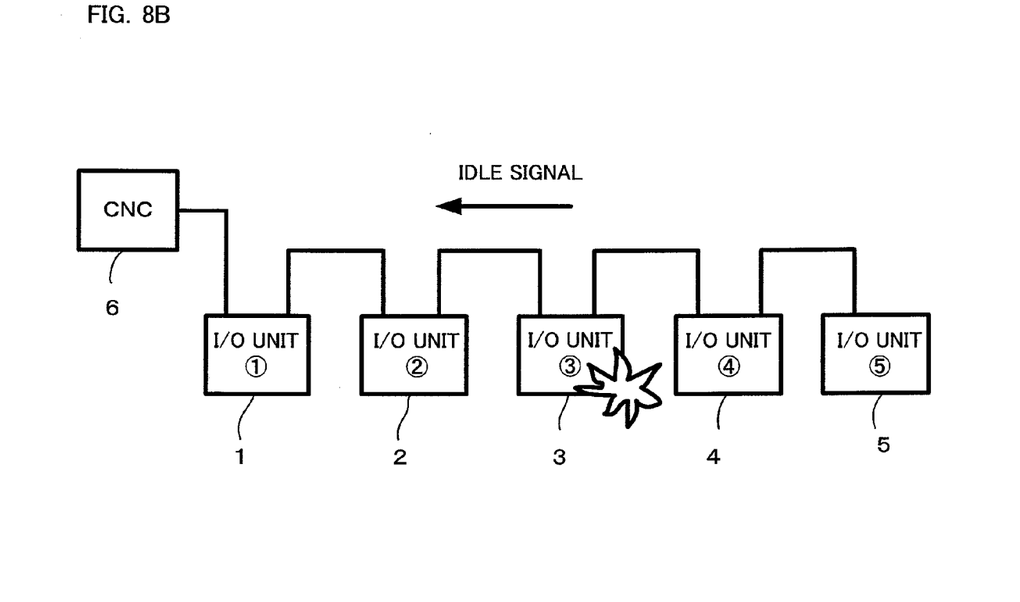

Furthermore, the numerical controller and the I/O unit communicate states of (that is, alarm information on) the respective I/O units simultaneously with the DI/DO data to use clarification of cause for occurrence of an alarm (see FIGS. 8A and 8B).

A technique for notifying the numerical controller and the machine tool of occurrence of power discontinuity to one of the I/O units as alarm information is already known as disclosed in, for example, Japanese Patent Application Laid-Open No. 2003-209590. However, according to this technique disclosed in the above patent document, it is necessary to hold a power supply voltage for internal circuits of each of the I/O units until the right of a communication line is guaranteed, however, for holding the power supply voltage, it is disadvantageously required to provide a large-capacity capacitor in each I/O unit, resulting in cost hike.

Moreover, a technique for detecting occurrence of a data communication failure at the time of transferring data between a higher-level device and a lower-level device in an information transfer processing apparatus in a telephone exchange system or the like is disclosed in, for example, Japanese Patent Application Laid-Open No. 5-211560. The technique disclosed in the above patent document adopts an auto-scanning scheme. If no reply is received, a communication failure alarm is produced. However, the problem with the auto-scanning-based technique is that the communication failure such as the power discontinuity and the disconnection of a communication line of I/O unit cannot be discriminated from each other (that is, it is impossible to identify whether the failure is the power discontinuity or the disconnection of the communication line during detection of the failure).

SUMMARY OF THE INVENTION

Therefore, it is an object of the present invention to provide a method of notifying alarm information indicating an occurrence of power discontinuity in any one (rear) I/O unit to the (front) I/O unit in front of the rear I/O unit and a method of detecting a communication line disconnection and a power discontinuity of an I/O unit so that a numerical controller can be discriminately notified of the communication line disconnection and the power discontinuity of the I/O unit.

According to one aspect of the present invention, there is provided a power discontinuity detection method for detecting a power discontinuity occurring in any one of a plurality of I/O units connected to a numerical controller. This method comprises: step of detecting the power discontinuity when the power discontinuity occurs in any one of the I/O units; step of transmitting the detection of the power discontinuity to a front I/O unit in front of said I/O unit where the power discontinuity occurs, at a timing different from a timing of an ordinary communication, in the form of a communication packet having a data pattern different from an ordinary data pattern; and step of storing the communication packet, when the front I/O unit receives that communication packet, as a power discontinuity detection information.

The power discontinuity detection method may further comprise: step of determining that a communication line connected to a rear I/O unit is disconnected if transmission of an idle signal from a rear I/O unit is interrupted without receiving said communication packet; and step of storing said disconnection of the communication line as information different from said power discontinuity detection information.

The above power discontinuity detection method may further comprise: step of determining that disconnection of the communication line or power discontinuity occurs in any one of the I/O units if the numerical controller does not receive a communication reply from the I/O units; step of acquiring alarm information on a disconnection of communication line or power discontinuity from the I/O units in order based on closeness to the numerical controller; and step of displaying, or outputting to an outside, the acquired alarm information.

With the method according to the present invention, the disconnection information and the power discontinuity information are transmitted only to the front I/O unit and communication of the other I/O units is not hampered. Furthermore, because of no need to wait for end of the other communication, time for holding power supply voltage for internal circuits of each I/O unit since detection of the power discontinuity can be shortened. Therefore, there is no need to prepare a large-capacity capacitor for holding the power supply voltage.

If one of the power discontinuity and the communication line disconnection occurs in one of the I/O units, any one of the I/O units does not transmit a reply to the numerical controller. If this state occurs, then the numerical controller successively acquires the alarm information from the respective I/O units located closer to the numerical controller on the communication lines, and clarifies cause for the alarm. It is thereby possible to discriminate whether the power discontinuity or the communication line disconnection occurs in one of the I/O units.

BRIEF DESCRIPTION OF THE DRAWINGS

The above and other objects and features of the present invention will be readily apparent from the following description of embodiments with reference to the accompanying drawings, wherein.

DETAILED DESCRIPTION OF THE PREFERRED EMBODIMENTS

Figure 1:
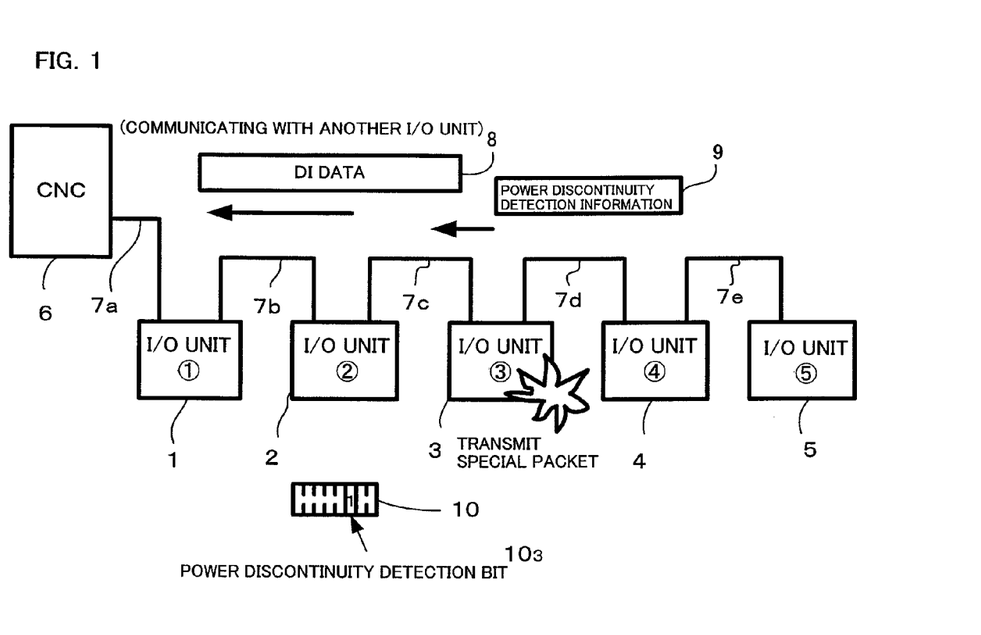
FIG. 1 is a schematic diagram showing a numerical control system configured to comprise a numerical controller (CNC) and a plurality of I/O units.

FIG. 1 is a schematic diagram of a numerical control system configured to include a numerical controller (CNC) 6 and I/O units 1 to 5. The five I/O units 1 to 5 are connected to the CNC 6 via communication lines 7a to 7e in a master-slave fashion, respectively. Although not shown, the CNC 6 also includes an I/O unit.

FIG. 1 shows a state in which a power discontinuity failure occurs in the I/O unit 3 while the CNC 6 is communicating DI data 8 (information transmitted from the I/O units to the CNC 6) with the I/O units other than the I/O unit 3. At this time, the I/O unit 3 transmits power discontinuity detection information 9 indicating that a power discontinuity occurs in the I/O unit 3 to the I/O unit 2 in front of the I/O unit 3. The power discontinuity detection information 9 is in the form of a packet. Therefore, such power discontinuity detection information 9 as in the form of a packet will be hereinafter referred to as power discontinuity notification communication packet.

In the example of FIG. 1, if the power discontinuity failure occurs in the I/O unit 3, the power discontinuity notification communication packet is transmitted only to the I/O unit 2 in front of the I/O unit 3 and not to the I/O unit 1 in front of the I/O unit 2 and to the CNC 6. In this case, only the I/O unit 2 can receive the power discontinuity notification communication packet.

Likewise, if a power discontinuity failure occurs in one of the I/O units 1, 2, 4, and 5 other than the I/O unit 3, the power discontinuity notification communication packet is transmitted only to the I/O unit in front of the I/O unit where the power discontinuity failure occurs. If a power discontinuity failure occurs in the I/O unit 1, the I/O unit (not shown) included in the CNC 6 serves as the "I/O unit in front of the I/O unit 1" and the power discontinuity detection information packet 9 is transmitted to the I/O unit included in the CNC 6.

A power discontinuity notification communication packet 10 shown in FIG. 1 is a special communication packet of eight bits prepared in each of the I/O units 1 to 5 in advance. In the power discontinuity notification communication packet 10, a third bit 103 is prepared as a power discontinuity detection bit. This power discontinuity notification communication packet 10 is configured to have a data pattern that is encrypted and that could not occur in case of an ordinary data communication.

Since the power discontinuity notification communication packet 10 is configured as stated above, it is possible to notify of occurrence of the power discontinuity failure in any one of the I/O units 1 to 5, to the I/O unit in front of the I/O unit where the power discontinuity occurs, by means of short data, thereby allowing finally notifying of occurrence of the power discontinuity failure to the CNC 6.

Figure 2:
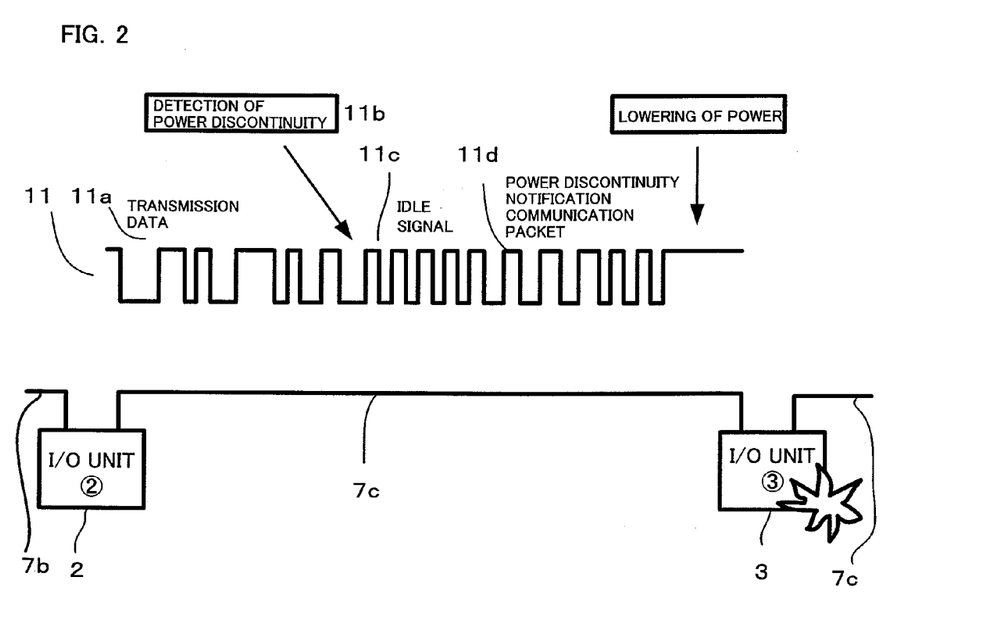
FIG. 2 is a schematic diagram showing a state in which a power discontinuity failure occurs in one of the I/O units communicating with the CNC shown in FIG. 1.

FIG. 2 shows a state in which a power discontinuity failure occurs in the I/O unit 3 that is communicating with the CNC 6. If the power discontinuity failure occurs in the I/O unit 3, the I/O unit 3 temporarily stops communicating with the CNC 6, transmits an idle signal 11c at a length of a few packets instead, and transmits a power discontinuity notification communication packet 11d to the CNC 6 subsequently to the idle signal 11c.

Referring to a signal 11 transmitted from the I/O unit 3 to the CNC 6 shown in FIG. 2, it is understood that the I/O unit 3 transmits ordinary transmission data 11a to the CNC 6 until the power discontinuity is detected and temporarily stops transmitting the transmission data 11a at a moment 11b when the power discontinuity is detected, transmitting the idle signal 11c followed by the transmission data 11a which has been transmitted so far, and further transmitting the power discontinuity notification communication packet 11d at a length of about one packet followed by the idle signal 11c. The aforementioned idle signal 11c having the length of about a few packets can be a signal in which a state of 1 is kept for certain time or longer.

The I/O unit 2 in front of the I/O unit 3 receives the idle signal 11c from the I/O unit 3 where the power discontinuity is detected, whereby the I/O unit 2 can receive the power discontinuity notification communication packet 11d, in distinction from the transmission data 11a which the I/O unit 2 has received up to that time. The power discontinuity notification communication packet 11d discriminated from the transmission data 11a is recorded in a register (not shown) included in the I/O unit 2 that receives the power discontinuity notification communication packet 11d.

Since transmission of the transmission data 11a is stopped halfway, the data 11a is destroyed. However, because of no reliability in transmission data from the I/O unit 3 where the power discontinuity occurs, no problem occurs even if the transmission data 11a is destroyed halfway along the transmission.

It is to be noted that the "power discontinuity notification communication packet 11d" shown in FIG. 2 is identical in data structure to the "power discontinuity notification communication packet 10" shown in FIG. 1 (and that they are denoted by different reference symbols for convenience of description).

Whether the state of the I/O unit 3 is the state shown in FIG. 1 (the state where the power discontinuity occurs in the I/O unit 3) or the state shown in FIG. 2 (the state where the power discontinuity occurs in the I/O unit 3), it suffices that the power discontinuity notification communication packet 10 or 11d is transmitted only to the I/O unit 2 in front of the I/O unit 3. Due to this, the power discontinuity notification communication packet 10 or 11d can be transmitted from the I/O unit 3 where the power discontinuity occurs in the I/O unit 2 in front of the I/O unit 3 without waiting for an access from the CNC 6. Eventually, therefore, voltage holding time for which the I/O unit 3 needs to hold the voltage during the power discontinuity can be shortened.

Figure 3:
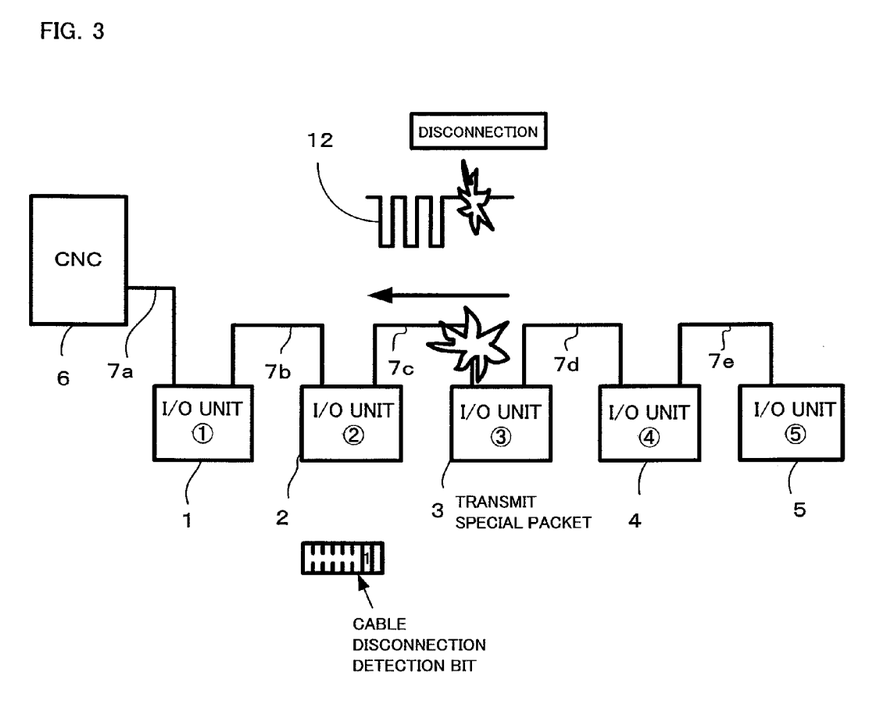
FIG. 3 is a schematic diagram showing a state in which a communication line is disconnected during transmission of transmission data.

FIG. 3 shows a state in which the communication line 7c is disconnected while the I/O unit 3 out of the I/O units 1 to 5 is transmitting transmission data 12. If not transmitting or receiving the DI/DO data during an ordinary communication, each of the I/O units 1 to 5 transmits or receives an idle signal. In addition, each of the I/O units 1 to 5 receives DI data (input information data) or the idle signal from its rear I/O unit and monitors this DI data or idle signal. It is to be noted that there is no need for the last-stage I/O unit (I/O unit 5 in the example of FIG. 3) to monitor the DI data or the idle signal.

In FIG. 3, if the I/O unit 2 does not receive the power discontinuity notification communication packet and stops receiving the idle signal from the I/O unit 3 in the rear of the I/O unit 2 (e.g., receives the signal representing 0 for certain time or longer), then the I/O unit 2 determines that the communication line 7c connecting the I/O unit 2 to the I/O unit 3 is disconnected, and records information indicating that the communication line 7c is disconnected in the register included in the I/O unit 2.

Figure 4:
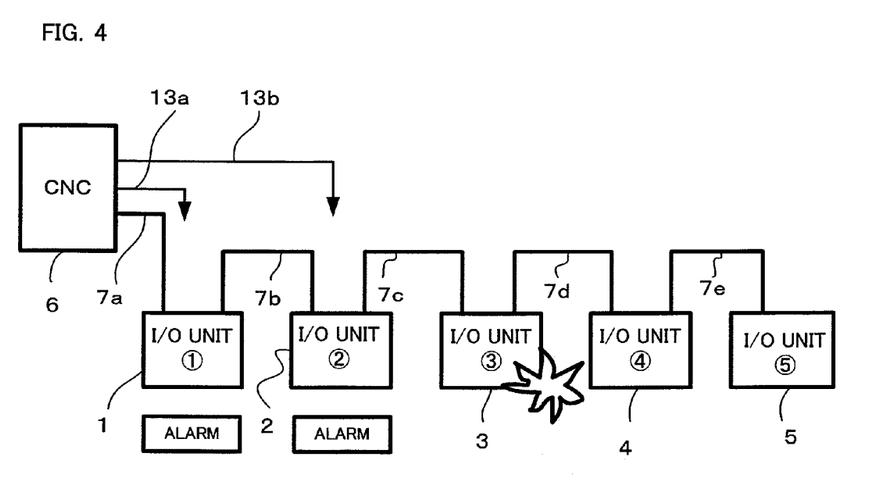
FIG. 4 is a schematic diagram explaining how the CNC acquires power discontinuity information or communication line disconnection information.

FIG. 4 is a schematic diagram explaining how the CNC 6 acquires power discontinuity information and communication line disconnection information. If power discontinuity occurs in any one of the I/O units 1 to 5 or disconnection occurs in any one of the communication lines 7a to 7e, the I/O units 1 to 5 do not transmit a reply to the CNC 6. If such state occurs, then the CNC 6 stops ordinary DI/DO data transmission/reception, transmits alarm information request signals 13a and 13b to the I/O units 1 to 5 in order based on closeness to the CNC 6 on the communication lines 7a to 7e (to the I/O unit 1 first, in the example of FIG. 4), and acquires the power discontinuity information or the communication line disconnection information. The acquired power discontinuity information or communication line disconnection information can be notified to the I/O units 1 to 5 by displaying cause for an alarm on a display screen (not shown) attached to the CNC 6.

Figure 5:
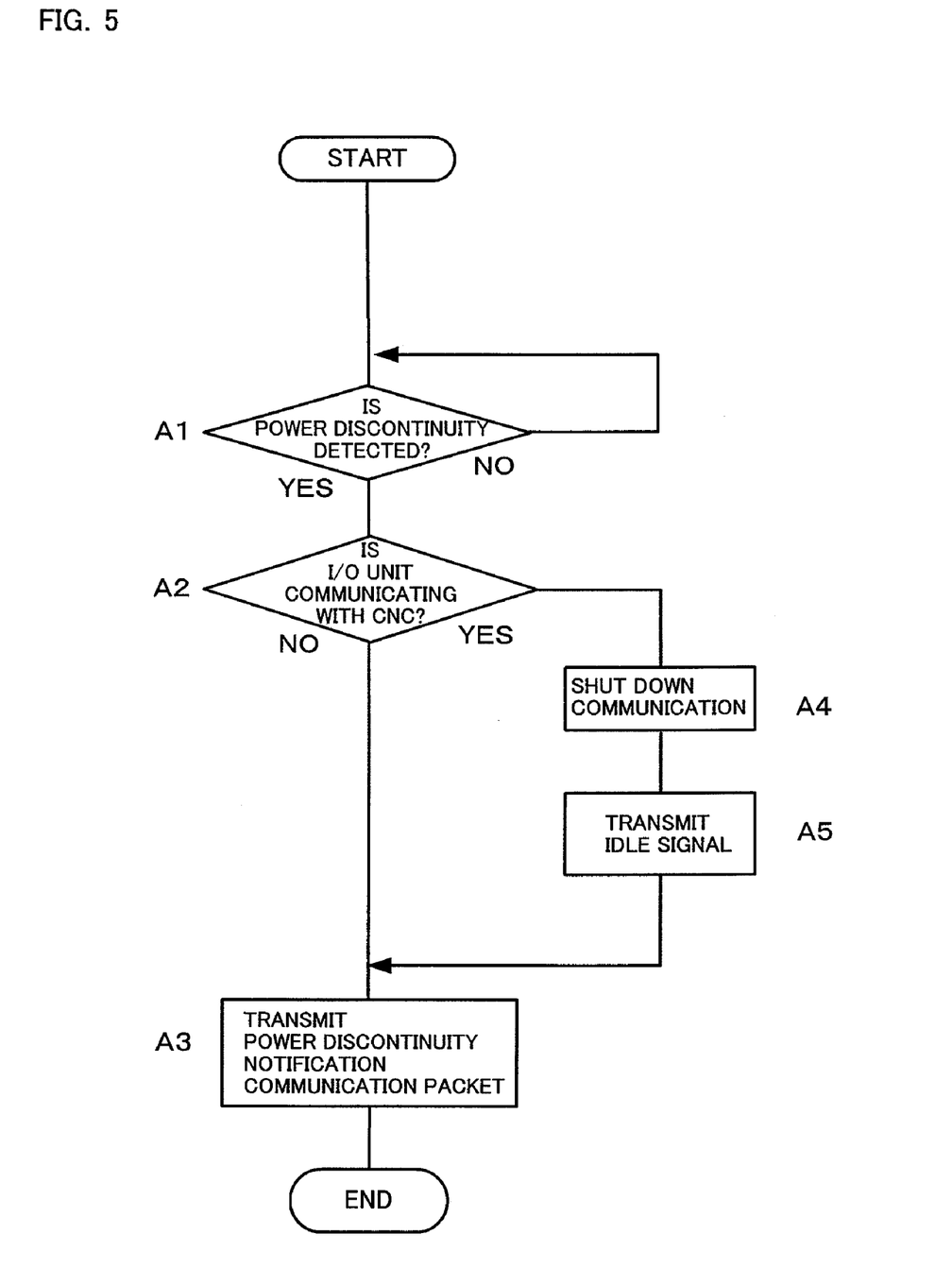
FIG. 5 is a flowchart showing an algorithm, executed by a processor included in any one of the I/O unit that constitute the numerical control system, for detecting an occurrence of a power discontinuity in the I/O unit and notifying of the power discontinuity to the (front) I/O unit in front of the I/O unit where the power disconnection occurs.

FIG. 5 is a flowchart showing an algorithm, executed by a processor included in one of the I/O units 1 to 5 constituting the numerical control system, for detecting that a power discontinuity failure occurs in the I/O unit and notifying the front I/O unit of the power discontinuity failure.

The processor determines whether a power discontinuity is detected or not (step A1). If the power discontinuity is not detected, the processor continues this detection until the power discontinuity is detected. If the power discontinuity is detected, the processor determines whether or not the I/O unit where the power discontinuity is detected is communicating with the CNC 6 (step A2). If the I/O unit is communicating with the CNC 6, then the processor shuts down the communication of the I/O unit (step A4), transmits the idle signal for a period corresponding to the length of a few packets (step A5), transmits the power discontinuity notification communication packet to the (front) I/O unit where the power discontinuity occurs (step A3), and finishes the power discontinuity notification processing.

If the processor determines in step A2 that the I/O unit where the power discontinuity occurs is not communicating with the CNC 6, the processor transmits the power discontinuity notification communication packet to the front I/O unit (step A3) and finishes this power discontinuity notification processing.

Figure 6:
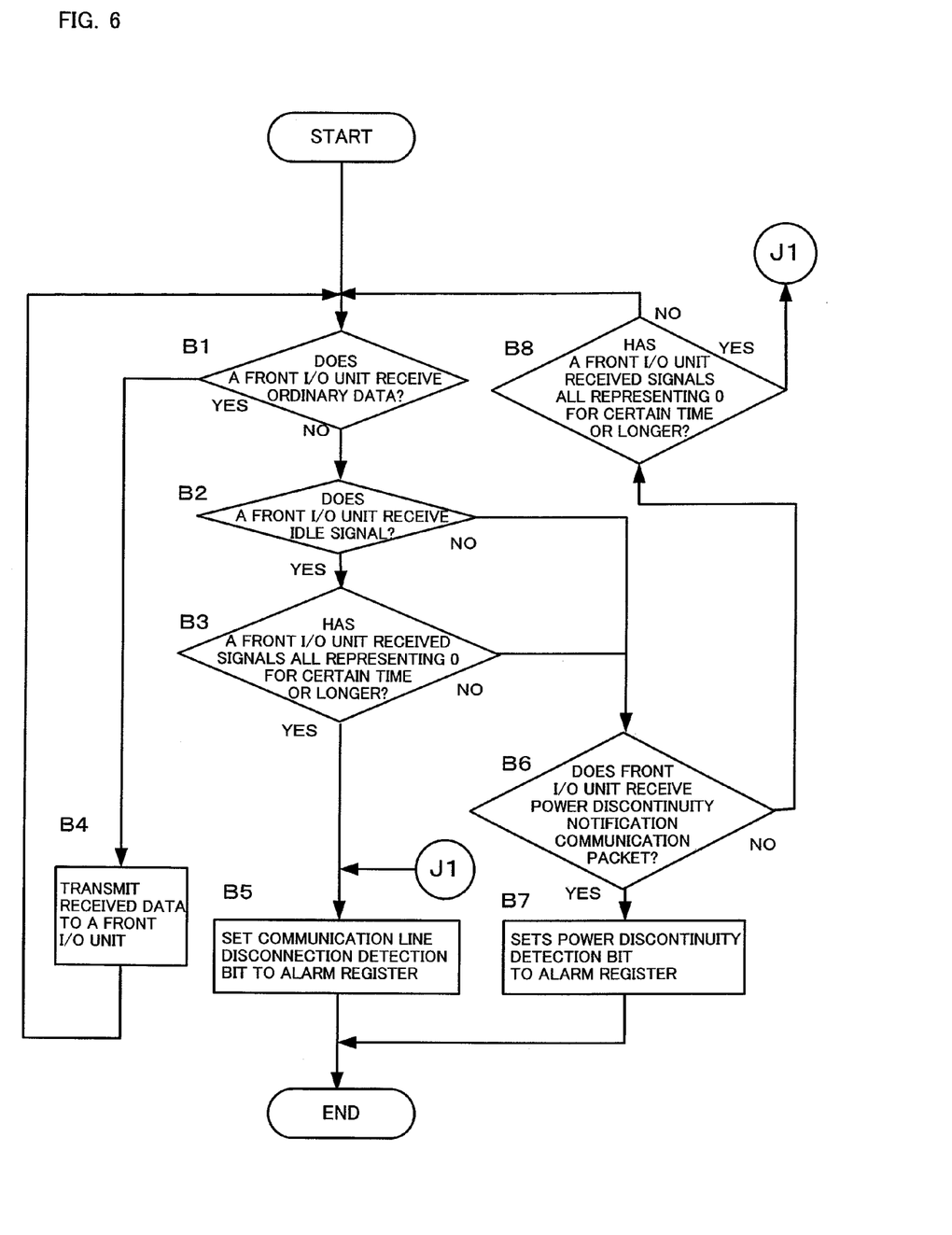
FIG. 6 is a flowchart showing an algorithm, executed by a processor included in the (front) I/O unit in front of the (rear) I/O unit where the power discontinuity occurs, for processing signals from the rear I/O unit.

FIG. 6 is a flowchart showing an algorithm, executed by a processor included in an I/O unit (or front I/O unit) in front of an I/O unit (or rear I/O unit) where power discontinuity failure occurs, for processing signals from the rear I/O unit.

First, the processor determines whether or not the front I/O unit receives ordinary data from the rear I/O unit (step B1). If the processor determines that the front I/O unit receives the ordinary data, the processor transmits the received data to the front I/O unit (or performs an ordinary data processing) (step B4) and returns to the step B1. If the processor determines that the front I/O unit does not receive the ordinary data, on the other hand, the processor determines whether or not the front I/O unit receives the idle signal (step B2). If the processor determines that the front I/O unit receives the idle signal, the processor determines whether or not the front I/O unit has received signals all representing 0 for certain time or longer (or determines whether or not the idle signal stops arriving at the front I/O unit) (step B3). If the processor determines that the front I/O unit has received signals all representing 0 for certain time or longer (step B3; YES), the processor sets a communication line disconnection detection bit to the alarm register (not shown) included in the front I/O unit (step B5) and finishes the processing.

If the processor determines in step B2 that the front I/O unit receives the idle signal or that the front I/O unit has not received signals all representing 0 for certain time or longer (or determines that the idle signal keeps arriving at the front I/O unit), the processor proceeds to a step B6, where the processor determines whether the front I/O unit receives the power discontinuity notification communication packet or not. If the processor determines that the front I/O unit does not receive the power discontinuity notification communication packet, the processor determines whether or not the front I/O unit has received signals all representing 0 for certain time or longer (step B8). If the processor determines that the front I/O unit has not received signals all representing 0 for certain time or longer, the processor returns to the step B1 from step B8. If the processor determines that the front I/O unit has received signals all representing 0 for certain time or longer on the other hand, the processor sets the communication line disconnection detection bit to the alarm register (not shown) included in the front I/O unit (step B5) and finishes the processing.

If the processor determines in step B6 that the front I/O unit receives the power discontinuity notification communication packet, the processor sets the power discontinuity detection bit to the alarm register (not shown) included in the front I/O unit (step B7) and finishes the processing.

Figure 7:
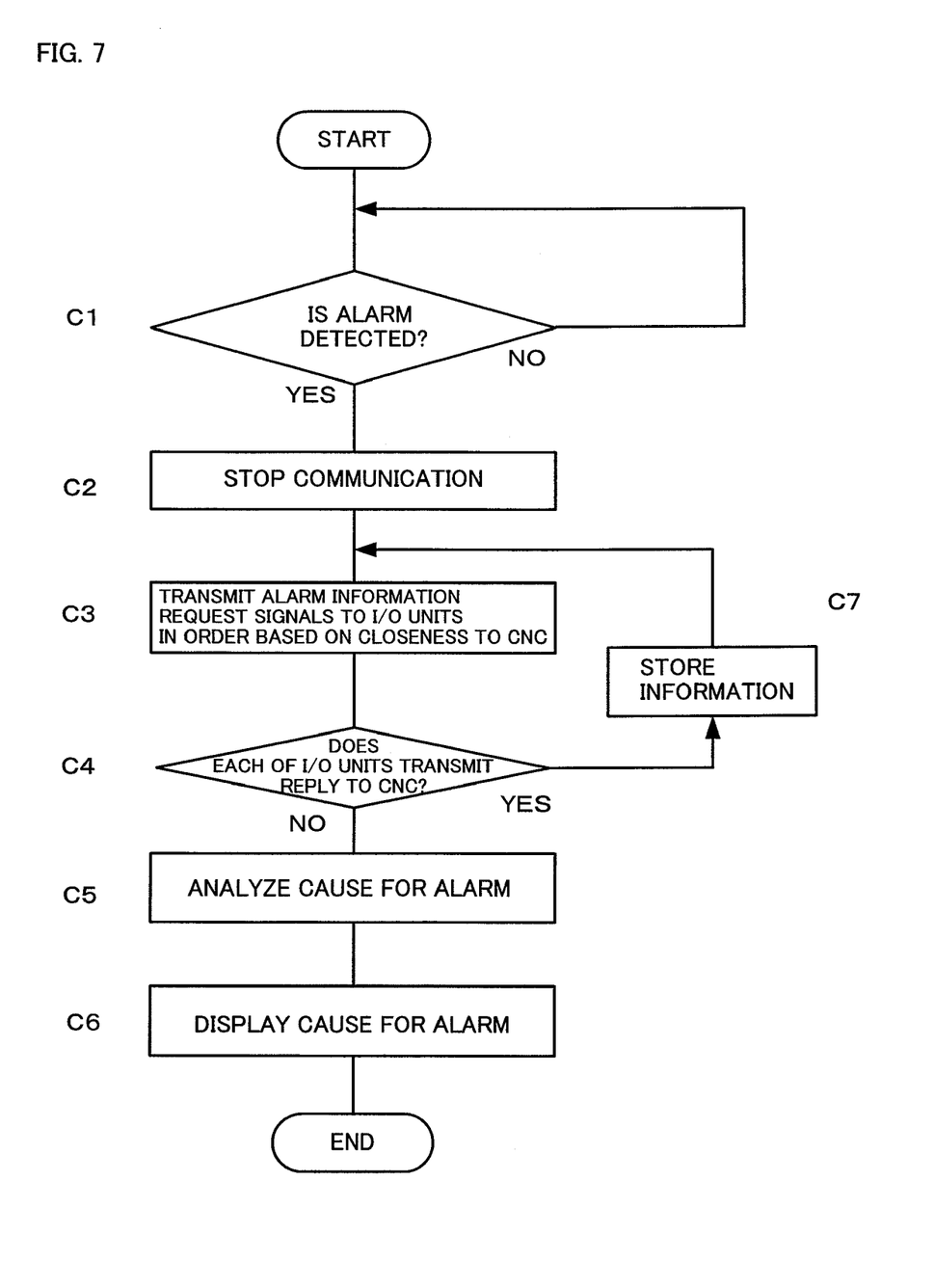
FIG. 7 is a flowchart showing an algorithm, executed by a processor included in the CNC, for acquiring the power discontinuity information or communication line disconnection information.

FIG. 7 is a flowchart showing an algorithm, executed by a processor included in the CNC 6, for acquiring the power discontinuity information or the communication line disconnection information.

First, the processor determines whether or not an alarm indicating that data is illegal or that the CNC 6 does not receive a reply is detected (step C1). If the alarm is not detected, the processor continues this detection until the alarm is detected. If the alarm is detected, the CNC 6 stops ordinary communication with the I/O units 1 to 5 (step C2) and transmits alarm information request signals 13a and 13b to all the I/O units 1 to 5 in order based on closeness to the CNC 6 (in order starting at the I/O unit 1) (step C3). The processor determines whether each of the I/O units 1 to 5 transmits a reply to the CNC 6 (step C4).

If the processor determines in step C4 that each of the I/O units 1 to 5 transmits a reply to the CNC 6, the processor stores the alarm information for which the I/O units 1 to 5 transmit replies to the CNC 6 in a storage device (not shown) included in the CNC 6 (step C7) and returns to the step C3, where the processor transmits the alarm information request signals 13a and 13b to all the I/O units 1 to 5. If the CNC 6 finishes collecting the alarm information from the I/O units 1 to 5 and the processor determines that none of the I/O units 1 to 5 transmit a reply to the CNC 6, the processor proceeds from step C4 (determination result: No) to a step C5, where the processor executes an analysis of cause for an alarm. Further, the processor displays the cause for the alarm (step C6) and finishes this disconnection information acquisition processing.

The invention claimed is:
1. A power discontinuity detection method for detecting a power discontinuity occurring in any one of a plurality of I/O units connected serially to one another via communication lines in a master-slave fashion, respectively, to a numerical controller, so as to communicate data between I/O units and the numerical controller the method comprising steps of:

- detecting the power discontinuity when the power discontinuity occurs in any one of the I/O units;
- transmitting the detection of the power discontinuity to a front I/O unit situated immediately before a rear I/O unit which is said I/O unit where the power discontinuity occurs, at a timing different from a timing of normal data communication, in the form of a communication packet having a data pattern different from a data pattern utilized during said normal data communication; and
- storing the communication packet, when the front I/O unit receives that communication packet, as a power discontinuity detection information.

2. The power discontinuity detection method according to claim 1, further comprising steps of:

- determining that a communication line connected to the rear I/O unit is disconnected if transmission of an idle signal from the rear I/O unit is interrupted without receiving said communication packet; and
- storing said disconnection of the communication line as information different from said power discontinuity detection information.

3. The power discontinuity detection method according to claim 2, further comprising steps of:

- determining that disconnection of the communication line or power discontinuity occurs in any one of the I/O units if the numerical controller does not receive a communication reply from the I/O units;
- acquiring alarm information on a disconnection of communication line or power discontinuity from the I/O units in order based on closeness to the numerical controller; and
- displaying, or outputting to an outside, the acquired alarm information.

4. A numerical control system for detecting a power discontinuity occurring in one of a plurality of I/O units connected serially to one another via communication lines in a master-slave fashion, respectively, to a numerical controller, so as to communicate data between I/O units and the numerical controller, wherein each of the I/O units includes:

- a detection unit detecting the power discontinuity when the power discontinuity occurs in the I/O unit;
- a transmission unit transmitting information on detection of power discontinuity to a front I/O unit situated immediately before a rear I/O unit which is said I/O unit where the power discontinuity occurs, at a timing different from a timing of normal data communication, in the form of a communication packet having a data pattern different from a data pattern utilized during said normal data communication; and
- a power discontinuity detection information storage unit receiving the communication packet when the communication packet is transmitted from the rear I/O unit and storing the received communication packet as the power discontinuity detection information.

5. The numerical control system according to claim 4, wherein said numerical controller comprises:

- a determination unit monitoring if transmission of an idle signal from the rear I/O unit is interrupted without receiving said communication packet, and determining that, if interruption of the idle signal is detected, disconnection of a communication line occurs; and
- a communication line disconnection information storage unit storing communication line disconnection information acquired by said determination unit.

6. The numerical control system according to claim 5, wherein said numerical controller further comprises:

- an alarm generation determination unit monitoring a reply of communication from the I/O units to the numerical controller, and determining, when receiving the reply with alarm generation information attached, that disconnection of the communication line or power discontinuity occurs in any one of the I/O units;
- an alarm information acquisition unit acquiring alarm information on a disconnection of communication line or power discontinuity from the I/O units in order based on closeness to the numerical controller; and
- a display/output unit displaying, or outputting to an outside, the acquired alarm information.

* * * * *